May 17, 1966

H. F. IRVING 3,251,512

FEEDER MEANS

Filed Feb. 12, 1965

*INVENTOR.*
HENRY F. IRVING

BY

ATTORNEYS

May 17, 1966  H. F. IRVING  3,251,512
FEEDER MEANS

Filed Feb. 12, 1965  2 Sheets-Sheet 2

INVENTOR.
HENRY F. IRVING.
BY
Learman, Learman & McCulloch
ATTORNEYS

United States Patent Office 3,251,512
Patented May 17, 1966

3,251,512
FEEDER MEANS
Henry F. Irving, Saginaw, Mich., assignor to Baker Perkins Inc., Saginaw, Mich., a corporation of New York
Filed Feb. 12, 1965, Ser. No. 438,162
7 Claims. (Cl. 222—232)

This application is a continuation-in-part of application Serial No. 162,716, filed December 28, 1961, now abandoned, and relates to feeding means for hoppers for feeding pulverulent or granulated products to chemical mixing machines and the like. The invention is specifically concerned with an agitator framework for a hopper which can be operated in conjunction with a feed screw for delivering materials, which have a tendency to bridge within the lower end of the hopper, to a mixer of the nature described in Patent No. 3,023,455. The invention has proven particularly useful for feeding low bulk density powders from a hopper into the feed screw without the excessive aeration which sometimes results when arms or the like are attached directly to the screw for accomplishing substantially the same purpose. Devices of the character to be described have processed a very fine, polypropylene powder, a pre-blend of plastic pellets and rubber granules, and pre-blends of different grades of asbestos and polypropylene pellets, with highly satisfactorily results.

A principal object of the invention is to design a hopper having an agitator including generally radially extending fins which are moved through a relatively small diameter, circular path having both radial and circumferential direction components.

A further object of the invention is to provide apparatus of this character which maintains a steady flow of material to the mixer and, in the sense that it feeds a uniform supply of material to a screw member, permits the screw member to de-aerate the material so that the full capacity of the mixing apparatus can be utilized.

Another object of the invention is to provide apparatus of the characted described wherein an agitator member mounted to operate with a feed screw element operates to tend to push the bulky powder into the screw flights.

A further object of the invention is to provide a hopper of the character mentioned wherein an agitating motion is applied directly to the material within the bin, instead of through the hopper walls, to move very difficult materials having relatively steep angles of repose out of the hopper construction quietly and gently.

Another object of the invention is to provide a relatively simple and yet reliable hopper agitator assembly which can be economically manufactured and assembled.

Other objects and advantages of the invention will be pointed out specifically or will become apparent from the following description when it is considered in conjunction with the appended claims and the accompanying drawings, in which:

Figure 1:
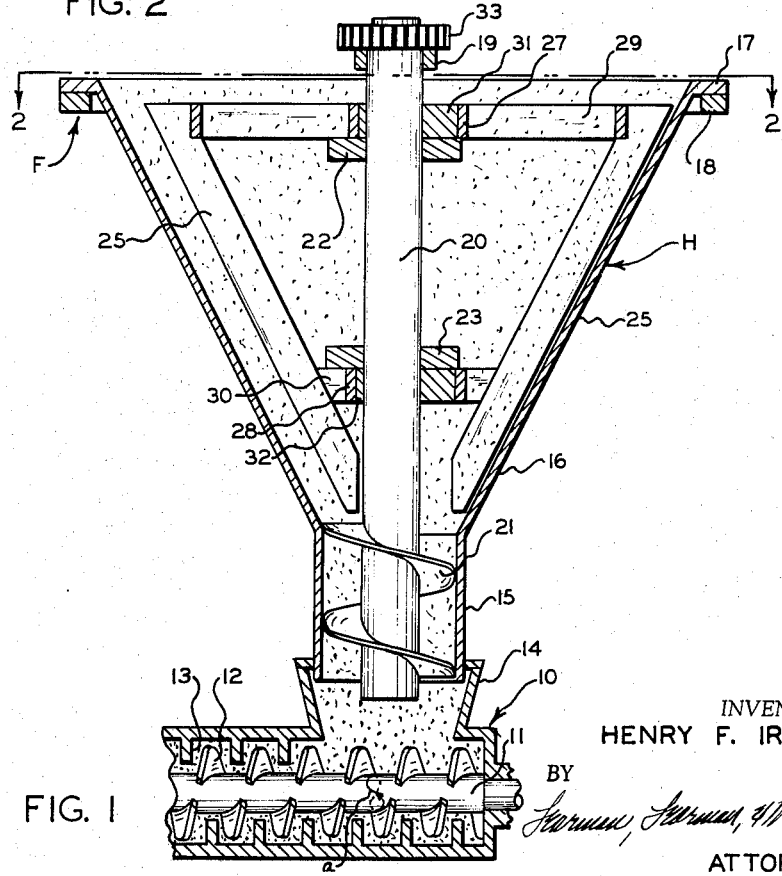
FIGURE 1 is a cross-sectional, elevational view showing the apparatus in operation feeding material to a mixer.

Referring now more particularly to the accompanying drawings, wherein are shown preferred embodiments of the invention only, the numeral 10 generally indicates a mixer housing such as disclosed in the aforementioned patent, the housing mounting a mixer shaft 11 for reciprocatory and rotary motion in the path of the arrow $a$. The thread segments 12 provided on the shaft 11 cooperate with the lugs 13 on the interior of housing 10 to provide a thorough, intensive mixing and kneading of the material which is fed to the housing 10 through a spout portion 14 as shown and is moved continuously in a leftward direction. (FIGURE 1.) Supported above the spout 14 by a framework F of any suitable design is a hopper generally designated H having a lowermost cylindrical extension portion 15 extending from its conical wall portion 16 into the mouth of the mixing machine spout 14. The hopper H at its enlarged upper end may be provided with a flange portion 17 supported on a ring 18 or the like forming a part of the supporting framework F.

Also constituting a part of the hopper support framework F is a bearing 19 which mounts a drive shaft 20 axially centrally within hopper H, the opposite end of the shaft 20 having screw flights 21 thereon which may extend radially sufficiently to engage the internal wall of the extension boot 15. Alternatively, a suitable bearing can be provided within the hopper H to support the lower end of shaft 20. Vertically spaced plates 22 and 23 are pinned to the shaft 20 and serve to support an agitator cage framework generally designated C which includes a ring member 24 having a plurality of dependent fins 25 fixed thereon and depending downwardly and inwardly at substantially the angle of the conical surface 16 of the hopper H. Upper and lower collar or bearing members 27 and 28, respectively, which are centrally disposed relative to the pairs of diametrically opposite fins 25 surround the shaft 20 and are connected to the ring 24 and lower ends of fins 25 by radially extending brace members 29 and 30, respectively.

It will be seen that eccentrics 31 and 32 of substantially the diameter of collars 27 and 28 and rotatably received therein are fixed to the shaft 20 and operate to shift the cage C laterally in an oscillatory movement as shaft 20 is rotated. The shaft 20 can be driven through a gear 33 fixed on its upper end and connected through any conventional speed reducer to an electric motor or the like. While it is not necessary that the shaft 20 be driven in this manner, it will be seen that, if it is, the bearing 19 serves to axially support the shaft 20 in position within the hopper H.

It will be assumed that the hopper H is filled to the level of flange 17 with a pulverulent material having a steep angle of repose which tends to agglomerate or bridge at the lower end of the conical portion 16 of housing H. With gear 33 being driven in a counterclockwise direction as indicated by the arrow $b$, each fin 25 is moved through the circular path indicated by the arrow $c$ with each complete revolution of drive shaft 20. Thus, each fin has a movement with radially outward and circumferential components and thence a movement with radially inward and circumferential components and mixes the material. The material in hopper H prevents the collars 27 and 28 from rotating with the eccentrics 31 and 32, or stops could be provided on the interior wall of the hopper adjacent fins 25. This agitation is excellently suited to debridging the material and feeding the screw 21 which can then pack de-aerated material into the mixer housing spout 14.

Figure 4:
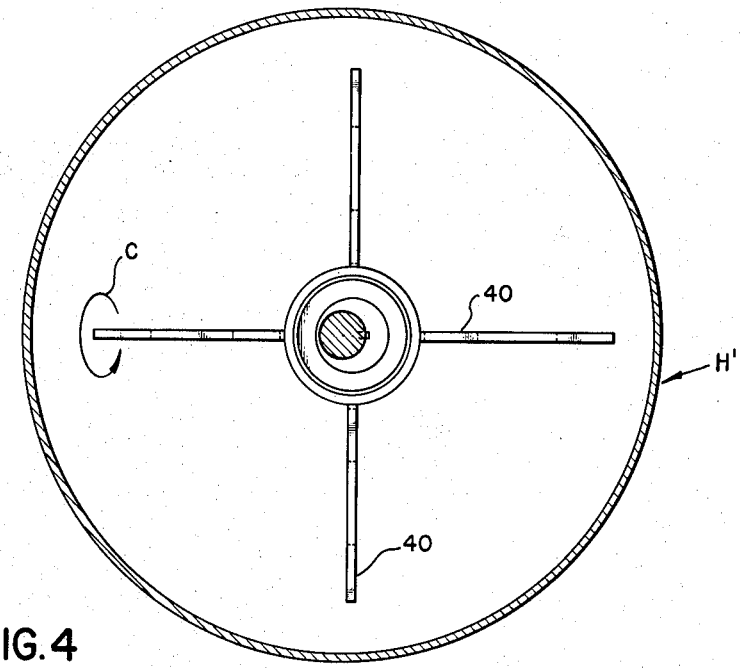
FIGURE 4 is a top plan view thereof.
Figure 3:
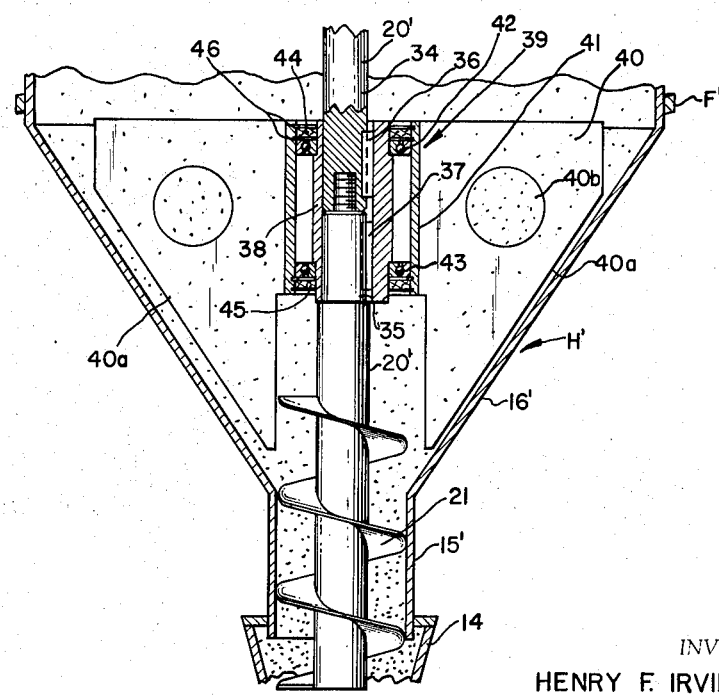
FIGURE 3 is a view similar to FIGURE 1 illustrating a modification of the invention.

In FIGURES 3 and 4 I have shown a modified embodiment of the invention wherein a hopper generally designated H' is supported by a framework F' and includes a lowermost cylindrical extension boot portion 15' extending from a conical wall portion 16' into the mouth of the mixing machine spout 14. The framework F' may mount a bearing (not shown but of the character of bearing 19) for supporting a drive shaft 20' axially centrally within hopper H', the opposite end of the shaft 20' similarly having screw flights 21' thereon which may extend radially sufficiently to engage the internal wall of the boot 15.

In this embodiment of the invention the shaft 20' includes an upper portion 34 and a lower portion 35, and keyed to both portions 34 and 35 as at 36 and 37, respectively, is one part 38 of an eccentric bearing assembly generally designated 39. The bearing assembly 39 also includes an outer ring member or part 41 on which the plurality of dependent fins 40 are fixed. Roller bearings 42 and 43 rotatably mount the outer ring 41 and therefore the fins 40 on the inner ring 38, and seals 44 and 45 may be provided as shown. The key members 36 and 37 are fixed on the eccentric ring 38 and thus serve to axially support the ring 38 on the shaft 20', and snap rings 46 for securing the bearings 42 and 43, and seals 44 and 45 serve to support the outer ring 41 in axial position on the inner ring 38, the inner ring 38 being shouldered as will be observed to support the bearings 42. The dependent fins 40 similarly include surfaces 40a extending downwardly and inwardly at substantially the angle of the conical surface 16' of the hopper H' and are provided with openings 40b. The shaft 20 can be driven by a gear, such as the gear 33 previously mentioned, which may be fixed on its upper end and connected through any conventional speed reducer to an electric motor in the manner previously indicated.

Figure 2:
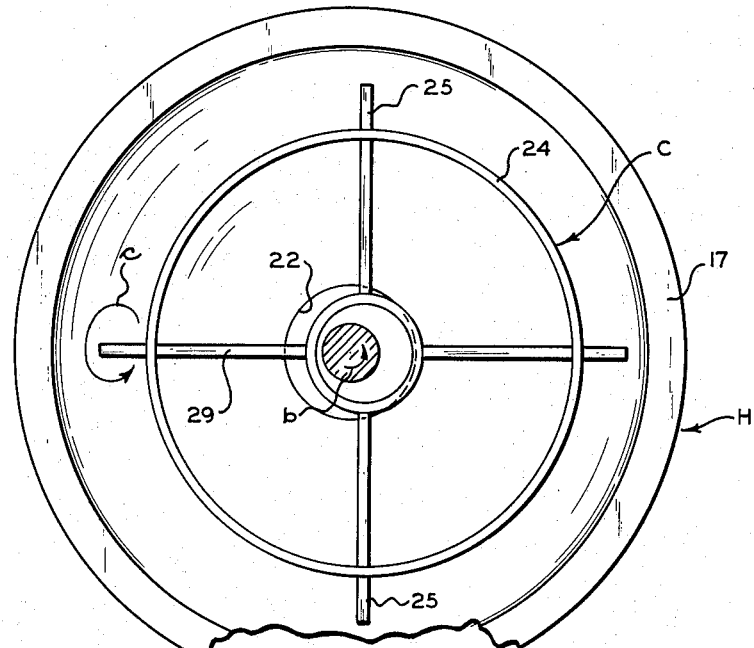
FIGURE 2 is a top plan view taken along the line 2—2 of FIGURE 1.

In operation the embodiment of the invention of FIGURES 3 and 4 operates in the same manner as the embodiment of the invention illustrated in FIGURES 1 and 2. If it be assumed that the hopper H is filled to a point above the level of the fins 40 with a pulverulent material having a steep angle of repose which tends to bridge at the lower end of the conical portion 16' of the housing, each fin 40 is moved through the orbital path indicated by the arrow c, with each complete revolution of the drive shaft 20 in a counterclockwise direction. As previously, the material in the hopper H prevent the fins 40 from rotating with the inner cam ring 38. This is possible because the fins have a substantial radial length and it will be observed that in the embodiment of FIGURES 3 and 4 the fins 40 have an even more substantial radial length than the fins in the embodiment of the invention illustrated in FIGURES 1 and 2. The agitation provided by the fins 40 does an excellent job of preventing bridging of the material and feeding the screw 21. Further, the fins 40 tend to mix the material.

It should be apparent that I have perfected a highly useful and practical agitator mechanism which is excellently suited to the purpose for which it was designed.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appeaded claims.

I claim:

1. Feeder apparatus comprising a hollow hopper having an annular side wall; a shaft rotatable about its own axis positioned at the longitudinal axis of said hopper; eccentric means fixed to said shaft for rotation therewith about the axis of said shaft; a plurality of axially elongated fins in said hopper arranged substantially uniformly about the axis of said shaft adjacent and substantially parallel to said wall, each of said fins having a substantial radial width; and radially extending means within said hopper journaling each of said fins on said eccentric means for relative rotation of said eccentric means and said fins, relative rotation of said eccentric means and said fins effecting movement of each of the latter in an orbital path located wholly between said side wall and the axis of said shaft.

2. Feeder apparatus comprising a hollow hopper having a conical wall converging at its lower end to a discharge opening; a shaft rotatable about its own axis extending into said hopper and being located at the longitudinal axis of the hopper; lower eccentric means fixed on said shaft adjacent said discharge end of said hopper for rotation with said shaft; upper eccentric means spaced from said lower eccentric means and fixed to said shaft for rotation with said shaft; lower and upper annular frame members journaled respectively on said lower and upper eccentric means for rotation relative thereto; and a plurality of circumferentially spaced fins secured at their lower and upper ends respectively to said lower and upper frame members and extending longitudinally of said hopper substantially parallel to and adjacent said wall, each of said fins having a substantial radial width, relative rotation of said eccentric means and said fins effecting movement of each of the latter in an orbital path located wholly between said shaft and said wall.

3. Feeder apparatus comprising a hollow hopper having a longitudinal axis and a side wall; shaft means rotatable about its own axis positioned at the longitudinal axis of said hopper; means mounted on said shaft means and including a first part fixed to said shaft and a second part relatively rotatable with said first part; one of said parts being eccentric to the other part; a plurality of axially elongated fins in said hopper arranged about the axis of said shaft adjacent said wall, each of said fins having a radial width substantially greater than its thickness; said fins being mounted on said second part for relative rotation of said shaft means and said fins, relative rotation of said shaft means and said fins effecting movement of each of the latter in an orbital path located wholly between said side wall and the axis of said shaft means.

4. The combination defined in claim 3 in which bearing means is disposed between said first and second parts of the second named means.

5. Feeder apparatus comprising a hollow hopper having a longitudinal axis and a side wall; shaft means rotatable about its own axis positioned longitudinally of said hopper; eccentric means fixed to said shaft means for rotation therewith about the axis of said shaft means; a plurality of fins in said hopper arranged about the axis of said shaft means and extending toward said wall, each of said fins having a radial width substantially greater than its thickness; and means within said hopper mounting each of said fins on said eccentric means for relative rotation of said eccentric means and said fins, relative rotation of said eccentric means and said fins effecting movement of each of the latter in an orbital path located wholly between said side wall and the axis of said shaft means.

6. The combination defined in claim 5 in which said fins have openings therein permitting the passage of material therethrough.

7. The combination defined in claim 5 in which said shaft has an upper and lower end, and pitched advancing flights are provided on the lower end of said shaft; and said fins extend longitudinally a sufficient distance to be radially aligned with a portion thereof.

References Cited by the Examiner

UNITED STATES PATENTS

| 1,934,899 | 11/1933 | White | 222—232 |
| 2,368,127 | 1/1945 | Fasick | 222—232 |
| 3,038,643 | 6/1962 | Van Der Lely et al. | 222—231 X |

FOREIGN PATENTS 855,677  11/1952  Germany.

EVON C. BLUNK, *Primary Examiner.*

HADD S. LANE, LOUIS J. DEMBO, *Examiners.*